(12) United States Patent
Huang et al.

(10) Patent No.: US 10,751,975 B2
(45) Date of Patent: Aug. 25, 2020

(54) COMPOSITE LAMINATE

(71) Applicant: Industrial Technology Research Institute, Hsinchu (TW)

(72) Inventors: Shi-Ing Huang, Zhunan Township (TW); Show-Hwai Chou, Zhudong Township (TW); Jhen-Rong Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/256,084

(22) Filed: Sep. 2, 2016

(65) Prior Publication Data
US 2017/0120561 A1 May 4, 2017

Related U.S. Application Data

(60) Provisional application No. 62/247,211, filed on Oct. 28, 2015.

(30) Foreign Application Priority Data

Jun. 22, 2016 (TW) .............................. 105119525 A

(51) Int. Cl.
*B32B 7/12* (2006.01)
*B32B 27/06* (2006.01)
(Continued)

(52) U.S. Cl.
CPC ................ *B32B 7/12* (2013.01); *B32B 9/041* (2013.01); *B32B 9/045* (2013.01); *B32B 15/04* (2013.01);
(Continued)

(58) Field of Classification Search
CPC ........... B32B 7/12; B32B 27/06; B32B 15/04; B32B 2250/04
(Continued)

(56) References Cited

U.S. PATENT DOCUMENTS 4,910,077 A * 3/1990 Benedikt ................. B32B 15/08
156/307.5
5,071,701 A * 12/1991 Tenney .................. C08G 61/08
174/250

(Continued)

FOREIGN PATENT DOCUMENTS

CN 1112877 A 12/1995
CN 1118367 A 3/1996
(Continued)

OTHER PUBLICATIONS

Machine English translation JP 08239642_A; Katayose, T.; Sep. 17, 1996; EPO; whole document (Year: 1996).*
(Continued)

*Primary Examiner* — Tahseen Khan
(74) *Attorney, Agent, or Firm* — Birch, Stewart, Kolasch & Birch, LLP

(57) ABSTRACT

A composite laminate includes a metal foil layer, a silane layer, a strengthening adhesive layer, and a hydrocarbon resin layer. The silane layer is disposed between the metal foil layer and the hydrocarbon resin layer. The strengthening adhesive layer is disposed between the silane layer and the hydrocarbon resin layer.

7 Claims, 1 Drawing Sheet

(51) Int. Cl.

| | | |
|---|---|---|
| *B32B 15/04* | (2006.01) | |
| *B32B 27/28* | (2006.01) | |
| *B32B 27/36* | (2006.01) | |
| *B32B 15/18* | (2006.01) | |
| *B32B 9/04* | (2006.01) | |
| *B32B 15/20* | (2006.01) | |
| *B32B 27/32* | (2006.01) | |

(52) U.S. Cl.
CPC ............ *B32B 15/18* (2013.01); *B32B 15/20* (2013.01); *B32B 27/06* (2013.01); *B32B 27/281* (2013.01); *B32B 27/283* (2013.01); *B32B 27/32* (2013.01); *B32B 27/36* (2013.01); *B32B 27/365* (2013.01); *B32B 2250/04* (2013.01); *B32B 2255/205* (2013.01); *B32B 2255/26* (2013.01); *B32B 2264/105* (2013.01); *B32B 2307/20* (2013.01); *B32B 2307/538* (2013.01); *B32B 2307/732* (2013.01)

(58) Field of Classification Search
USPC .......................................... 428/216
See application file for complete search history.

(56) References Cited

U.S. PATENT DOCUMENTS

| | | | | |
|---|---|---|---|---|
| 5,190,808 | A * | 3/1993 | Tenney | C08G 61/08 428/209 |
| 5,614,324 | A | 3/1997 | Poutasse et al. | |
| 5,709,957 | A | 1/1998 | Chiang et al. | |
| 5,861,076 | A * | 1/1999 | Adlam | B32B 37/0038 148/272 |
| 6,132,851 | A | 10/2000 | Poutasse | |
| 6,492,030 | B1 * | 12/2002 | Hashimoto | C08G 73/106 428/447 |
| 2003/0171477 | A1 | 9/2003 | Baba et al. | |
| 2003/0176124 | A1 | 9/2003 | Koike et al. | |
| 2004/0122153 | A1 * | 6/2004 | Guo | B82Y 30/00 524/430 |
| 2007/0059535 | A1 * | 3/2007 | Nakamura | C09J 143/04 428/447 |
| 2008/0038528 | A1 | 2/2008 | Paul | |
| 2011/0001190 | A1 * | 1/2011 | Ide | C08G 77/388 257/347 |

FOREIGN PATENT DOCUMENTS

| | | |
|---|---|---|
| CN | 1662120 A | 8/2005 |
| CN | 101423735 A | 5/2009 |
| CN | 101522318 A | 9/2009 |
| CN | 101896537 A | 11/2010 |
| CN | 101917826 A | 12/2010 |
| CN | 102618164 A | 8/2012 |
| CN | 102807838 A | 12/2012 |
| CN | 103702511 A | 4/2014 |
| CN | 104584699 A | 4/2015 |
| EP | 2 770 025 A1 | 8/2014 |
| JP | 08239642 A * | 9/1996 |
| JP | 2000-106476 A | 4/2000 |
| JP | 2004-169088 A | 6/2004 |
| TW | 440529 B | 6/2001 |
| TW | I230170 B | 4/2005 |
| TW | 200808536 A | 2/2008 |
| TW | I423882 B | 1/2014 |

OTHER PUBLICATIONS

Chruściel et al., "Istiodification of epoxy resins with functional silanes,potysiloxanes, silsesquioxanes, silica and silicates", Progress in Polymer Science, 2015, vol. 41, pp. 67-121.

Healy et al., "The chemistry of the additives in an acid copper electroplating bath Part I. Polyethylene glycol and chloride ion", Journal of Electroanalytical Chemistry, vol. 338, Issues 1-2, Oct. 1992, pp. 155-165, total 13 pages.

Healy et al., "The chemistry of the additives in an add copper electroplating bath Part II. The instability of 4,5-dithiaoctarte-1,8-disulphonic acid in the bath on open circuit", Journal of Electroanalytical Chemistry, vol. 338, Issues 1-2, Oct. 1992, pp. 167-177, total 14 pages.

Healy et al., "The chemistry of the additives in an acid copper electroplating bath Part III. The mechanism of brightening by 4;5-dithiaoctane-1,8-disulphonic acid", Journal of Electroanalytical Chemistry, vol. vol. 338, Issues 1-2, Oct. 1992, pp. 179-187.

Wightman et al., "Surface chemical aspects of polymer/metal adhesion", International Journal of Adhesion and Adhesives, vol. 12, No. 3, Jul. 1992, pp. 133-137.

Chinese Office Action dated Apr. 2, 2018 for Chinese Application No. 201610630804.9.

Chinese Office Action and Search Report, dated Oct. 12, 2018, for Chinese Application No. 201610630804.9.

* cited by examiner

COMPOSITE LAMINATE

CROSS-REFERENCE TO RELATED APPLICATION

This application claims the priority benefit of U.S. provisional application Ser. No. 62/247,211, filed on Oct. 28, 2015 and Taiwan application serial no. 105119525, filed on Jun. 22, 2016. The entirety of each of the above-mentioned patent applications is hereby incorporated by reference herein and made a part of this specification.

TECHNICAL FIELD

The disclosure relates to a composite laminate.

BACKGROUND

The new generation of electronic products tends to be light and small, and high-frequency transmission capability is needed, and therefore the wiring density of the circuit board is becoming higher, and the material selection of the circuit board is becoming more demanding. In general, a high-frequency electronic device is bonded to a circuit board. To maintain the transmission rate and the transmission signal integrity, lower dielectric constant and dielectric loss (or dissipation factor) are needed for the substrate material of the circuit board because the signal transmission speed of the substrate and the square root of the dielectric constant of the substrate material are inversely proportional, and therefore a smaller dielectric constant of the substrate material is usually better; moreover, since a smaller dielectric loss indicates smaller loss in signal transmission, the transmission quality provided by a material having smaller dielectric loss is also better.

In general, the substrate of a circuit board is formed by bonding a metal foil and a hydrocarbon resin layer via a lamination method to improve the high dielectric constant and the dielectric loss value, and to increase flame retardance and moisture absorption. The adhesion between the metal foil and the hydrocarbon resin layer affects the properties of the resulting circuit board, and therefore also affects the function and the reliability of the electronic product. However, the adhesion between current hydrocarbon resin material having good dielectric properties and the metal foil is insufficient, such that the function and the reliability of the electronic product made thereby are affected.

Therefore, the development of a substrate having low dielectric constant and low dielectric loss is important topic in the relevant art at this stage. The application of this substrate in the manufacture of a high frequency circuit board is also important topic in the relevant art at this stage.

SUMMARY

The disclosure provides a composite laminate.

In accordance with one embodiment of the disclosure, a composite laminate is provided. The composite laminate includes a metal foil layer, a silane layer, a strengthening adhesive layer, and a hydrocarbon resin layer. The silane layer is disposed between the metal foil layer and the hydrocarbon resin layer. The strengthening adhesive layer is disposed between the silane layer and the hydrocarbon resin layer.

In accordance with another embodiment of the disclosure, a composite laminate is provided. The composite laminate includes a first metal foil layer, a first silane layer, a first strengthening adhesive layer, a hydrocarbon resin layer, a second strengthening adhesive layer, a second silane layer, and a second metal foil layer. The hydrocarbon resin layer is disposed between the first metal foil layer and the second metal foil layer. The first silane layer is disposed between the first metal foil layer and the hydrocarbon resin layer. The first strengthening adhesive layer is disposed between the first silane layer and the hydrocarbon resin layer. The second silane layer is disposed between the second metal foil layer and the hydrocarbon resin layer. The second strengthening adhesive layer is disposed between the second silane layer and the hydrocarbon resin layer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Hereinafter, embodiments of the disclosure are described in detail. The details provided in the embodiments are exemplary, and are not intended to limit the scope of the disclosure. Those having ordinary skill in the art can modify or change the details according to the requirements of actual implementation. "A" and "an" in the disclosure represent "at least one".

Figure 1:
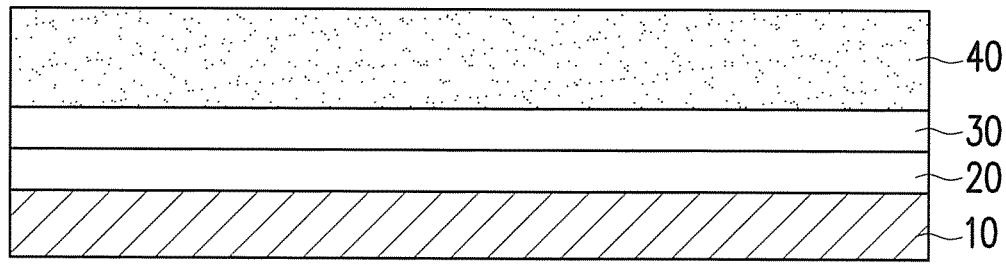
FIG. 1 is a cross-sectional schematic of a composite laminate shown according to an embodiment of the disclosure.

Referring to FIG. 1, a composite laminate 1 of the disclosure can contain: a metal foil layer 10, a silane layer 20, a strengthening adhesive layer 30, and a hydrocarbon resin layer 40. The silane layer 20 is disposed between the metal foil layer 10 and the hydrocarbon resin layer 40, and the strengthening adhesive layer 30 is disposed between the silane layer 20 and the hydrocarbon resin layer 40.

According to an embodiment of the disclosure, the material of the metal foil layer 10 can be, for instance, a conductive foil formed by copper, aluminum, iron, silver, palladium, nickel, chromium, molybdenum, tungsten, zinc, manganese, cobalt, gold, tin, lead, or stainless steel. As the metal foil layer 10, for example, copper foil can be employed. The copper foil in the present embodiment can be refined, milled or electrodeposited copper foil. The electrodeposited copper foil has a shiny surface and a rough surface in general, and the silane layer of the present embodiment can be formed on the shiny surface or the rough surface of the copper foil.

According to an embodiment of the disclosure, the root-mean-square roughness of the metal foil layer 10 is below 0.6 micrometers ($Rq \leq 0.6$ μm), and the ten-point average roughness of the surface is below 5 μm ($Rz \leq 5$ μm).

According to an embodiment of the disclosure, the silane layer 20 can contain a silane compound having a double bond functional group. According to an embodiment of the disclosure, the silane compound having the double bond functional group can have a structure of chemical formula $R_1$—$Si(OR_2)_3$, wherein $R_1$ is $C_2$ to $C_8$ alkenyl, $R_2$ is $C_1$ to $C_8$ alkyl, $R_1$ can be vinyl or allyl, and $R_2$ can be $CH_3$ or $C_2H_5$, such as vinyl trimethoxysilane, vinyl triethoxysilane, vinyl tri(2-methoxyethoxy)silane, vinyl trisopropoxysilane, allyl-trimethoxysilane, or allyltriethoxysilane.

In an embodiment of the disclosure, the silane compound or mixture can be coated on a metal foil surface alone or with a suitable solvent. In general, the silane compound is dispersed in a suitable solvent and then coated on a metal foil via reverse roll coating, blade coating, dip coating, or a stencil method to form a wet film. Then, a one-stage baking process is performed, such as baking at 130° C. for 5-15 minutes to form the metal foil layer 10 having the silane layer 20.

According to an embodiment of the disclosure, the strengthening adhesive layer 30 contains a compound having 3 or more double bond functional groups and a polymerization initiator, for instance. In an embodiment of the disclosure, based on 1 part by weight of the compound having 3 or more double bond functional groups, the polymerization initiator is 0.01-0.3 parts by weight. According to an embodiment of the disclosure, the compound having 3 or more double bond functional groups can be an isocyanurate compound having 3 or more double bond functional groups such as trimethylallyl isocyanurate (TMAIC) or triallyl isocyanurate (TAIC), or a cyclotetrasiloxane compound having 3 or more double bond functional groups such as tetramethyl tetravinyl cyclotetrasiloxane (TMTVC), or polyhedral oligomeric silsesquioxane (POSS) having 3 or more double bond functional groups such as octavinyl-POSS. The polymerization initiator can be organic peroxide such as cumene hydroperoxide. In an embodiment of the disclosure, the material of the strengthening adhesive layer 30 can further contain a solvent, and the solvent can be methyl ethyl ketone (MEK), and in an embodiment of the disclosure, the concentration of the compound having 3 or more double bond functional groups is between 0.1 wt % and 50 wt %.

The material of the strengthening adhesive layer 30 is coated on the surface of the silane layer 20, and the material of the strengthening adhesive layer 30 is generally dispersed in a suitable solvent such as methyl ethyl ketone and then coated on the metal foil layer 10 having the silane layer 20 using reverse roll coating, blade coating, dip coating, or a stencil method to form a wet film. Then, a one-stage baking process is performed, such as baking at 50° C. to 70° C. for 5-15 minutes to form the metal foil 10 having the strengthening adhesive layer 30 and the silane layer 20. In an embodiment, the total thickness of the dried thin film formed by the strengthening adhesive layer 30 and the silane layer 20 on the metal foil layer 10 is less than 2 micrometers.

According to an embodiment of the disclosure, the material of the hydrocarbon resin layer 40 can be, for instance, polyimide (PI), polycarbonate (PC), polyethersulfone (PES), polynorbornene (PNB), polyetherimide (PEI), polyethylene naphthalate (PEN), polyethylene terephthalate (PET), polydimethyl butene, or a combination thereof. The hydrocarbon resin layer 40 is generally bonded to the metal foil layer 10 via a lamination method.

Figure 2:
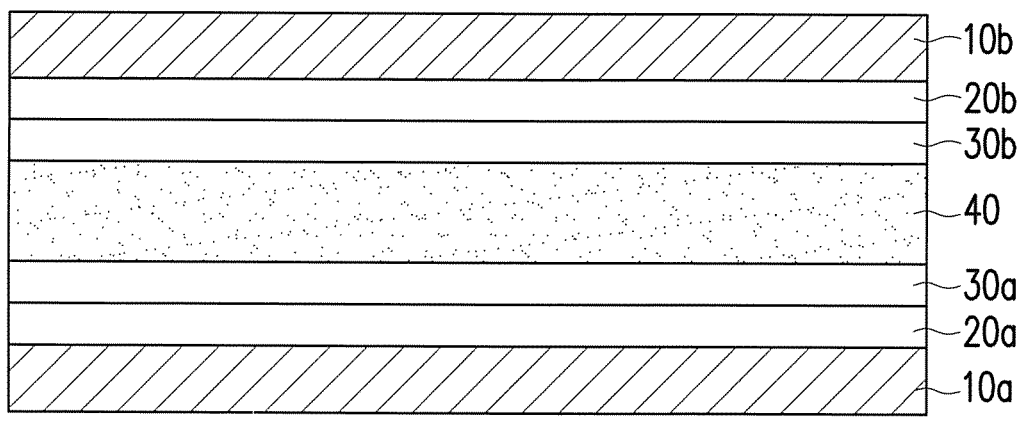
FIG. 2 is a cross-sectional schematic of a composite laminate shown according to another embodiment of the disclosure.

FIG. 2 is a cross-sectional schematic of a composite laminate shown according to another embodiment of the disclosure. With reference to FIG. 2, a composite laminate 1' of the present embodiment includes: a first metal foil layer 10a, a first silane layer 20a, a first strengthening adhesive layer 30a, a hydrocarbon resin layer 40, a second metal foil layer 10b, a second silane layer 20b, and a second strengthening adhesive layer 30b. The hydrocarbon resin layer 40 is disposed between the first metal foil layer 10a and the second metal foil layer 10b, the first silane layer 20a is disposed between the first metal foil layer 10a and the hydrocarbon resin layer 40, the first strengthening adhesive layer 30a is disposed between the first silane layer 20a and the hydrocarbon resin layer 40, the second silane layer 20b is disposed between the second metal foil layer 10 and the hydrocarbon resin layer 40, and the second strengthening adhesive layer 30b is disposed between the second silane layer 20b and the hydrocarbon resin layer 40.

According to an embodiment of the disclosure, the material of the metal foil layers 10a and 10b can be, for instance, a conductive foil formed by copper, aluminum, iron, silver, palladium, nickel, chromium, molybdenum, tungsten, zinc, manganese, cobalt, gold, tin, lead, or stainless steel. Using copper foil as an example, the copper foil used in the present embodiment can be refined or milled copper foil, and can also be electrodeposited copper foil. The general electrodeposited copper foil has a shiny surface and a rough surface, and the silane layer of the present embodiment can be formed on the shiny surface or the rough surface of the copper foil.

According to an embodiment of the disclosure, the root-mean-square roughness of the metal foil layers 10a and 10b is below 0.6 micrometers (Rq≤0.6 μm), and the ten-point average roughness of the surface is below 5 μm (Rz≤5 μm).

According to an embodiment of the disclosure, the silane layers 20a and 20b each independently contain a silane compound having a double bond functional group. According to an embodiment of the disclosure, the silane compound having the double bond functional group can have a structure of chemical formula $R_1$—$Si(OR_2)_3$, wherein $R_1$ is $C_2$ to $C_8$ alkenyl, $R_2$ is $C_1$ to $C_8$ alkyl, $R_1$ can be vinyl or allyl, and $R_2$ can be $CH_3$ or $C_2H_5$, such as vinyl trimethoxysilane, vinyl triethoxysilane, vinyl tri(2-methoxyethoxy)silane, vinyl trisopropoxysilane, allyltrimethoxysilane, or allyltriethoxysilane.

In an embodiment of the disclosure, the silane compound or mixture can be coated on a metal foil surface alone or with a suitable solvent. In general, the silane compound is dispersed in a suitable solvent and then coated on a metal foil via reverse roll coating, blade coating, dip coating, or a stencil method to form a wet film. Then, a one-stage baking process is performed, such as baking at 130° C. for 5-15 minutes to form the metal foil layers 10a and 10b having the silane layers 20a and 20b respectively.

According to an embodiment of the disclosure, the material of the strengthening adhesive layers 30a and 30b each independently contain a compound having 3 or more double bond functional groups and a polymerization initiator. In an embodiment of the disclosure, based on 1 part by weight of the compound having 3 or more double bond functional groups, the polymerization initiator is between 0.01-0.3 parts by weight. According to an embodiment of the disclosure, the compound having 3 or more double bond functional groups can be an isocyanurate compound having 3 or more double bond functional groups such as trimethylallyl isocyanurate (TMAIC) or triallyl isocyanurate (TAIC), or a cyclotetrasiloxane compound having 3 or more double bond functional groups such as tetramethyl tetravinyl cyclotetrasiloxane (TMTVC), or polyhedral oligomeric silsesquioxane (POSS) having 3 or more double bond functional groups such as octavinyl-POSS. The polymerization initiator can be organic peroxide such as cumene hydroperoxide. In an embodiment of the disclosure, the material of the strengthening adhesive layer 30 can further contain a solvent, and the solvent can be methyl ethyl ketone (MEK), and in an embodiment of the disclosure, the concentration of the compound having 3 or more double bond functional groups is between 0.1 wt % and 50 wt %.

The material of the strengthening adhesive layers 30a and 30b is coated on the surface of the silane layers 20a and 20b, and the material of the strengthening adhesive layer 30a or 20b is generally dispersed by a suitable solvent such as methyl ethyl ketone and then coated on the metal foil layers 10a and 10b respectively having the silane layers 20a and 20b using reverse roll coating, blade coating, dip coating, or a stencil method to form a wet film. Then, a one-stage baking process is performed, such as baking at 50° C. to 70° C. for 5-15 minutes to form the metal foils 10a and 10b having the strengthening adhesive layers 30a and 30b and the silane layers 20a and 20b respectively. In an embodiment, the total thicknesses of each of a dried thin film formed by the strengthening adhesive layers 30a and 30b respectively with the silane layers 20a and 20b on the metal foil layers 10a and 10b is less than 2 micrometers.

According to an embodiment of the disclosure, the material of the hydrocarbon resin layer 40 can be, for instance, polyimide (PI), polycarbonate (PC), polyethersulfone (PES), polynorbornene (PNB), polyetherimide (PEI), polyethylene naphthalate (PEN), polyethylene terephthalate (PET), polydimethyl butene, or a combination thereof. The hydrocarbon resin layer 40 is disposed between the metal foil layer 10a having the strengthening adhesive layer 30a and the silane layer 20a and the metal foil layer 10b having the strengthening adhesive layer 30b and the silane layer 20b, and then the layers are bonded via a lamination method.

EXAMPLES

Measuring instrument and method in the following examples: the instrument measuring peel strength in the following examples is purchased from Hung Ta Instrument Co., Ltd., model: HT-9102, and the measuring method includes measuring the 90° peel strength according to IPC-TM-650 specification.

(1) Preparation of coating solution of the silane layer: vinyl trimethoxysilane was dissolved in water, and then acetic acid was added dropwise to adjust the pH value of the solution to about 4 to form a silane aqueous solution having a weight percentage of 1%.

(2) Preparation of coating solution of the strengthening adhesive layer I: 2 g of octavinyl-POSS and 0.4 g of cumene hydroperoxide were dissolved in 2 g of methyl ethyl ketone and the mixture was stirred at room temperature (about 25° C.) to obtain the coating of the strengthening adhesive layer I.

(3) Preparation of coating solution of the strengthening adhesive layer II: 4 g of tetramethyl tetravinyl cyclotetrasiloxane (TMTVC) and 0.4 g of cumene hydroperoxide were dissolved in 2 g of methyl ethyl ketone and the mixture was stirred at room temperature (about 25° C.) to obtain the coating of the strengthening adhesive layer II.

(4) Preparation of coating solution of the strengthening adhesive layer III: 2 g of TMAIC and 0.4 g of cumene hydroperoxide were dissolved in 2 g of methyl ethyl ketone and the mixture was stirred at room temperature (about 25° C.) to obtain the coating solution of the strengthening adhesive layer III.

Manufacture of Composite Laminates of Examples 1 to 3

Manufacture of composite laminate: a copper foil substrate (purchased from Mitsui, model: HS-VSP, thickness: about 35 μm, surface roughness Rq: about 0.5) is provided. The aforementioned coating solution of the silane layer was sprayed on the copper foil substrate, and then the silane layer coated substrate was kept in the oven at 130° C. for 10 minutes. The copper foil substrate having a silane layer was obtained. Then, of the coating solutions of the strengthening adhesive layer I, II, and III were sprayed on the copper foil substrate having the silane layer, and then baking was performed in an oven at 60° C. for 10 minutes. Accordingly, the copper foil substrate is obtained in which a total thickness of a strengthening adhesive layer and the silane layer is less than 1 Next, a hydrocarbon resin layer (made by Rogers Co., model: RO-4450, thickness: 4 mil) was laminated on the copper foil substrate having the strengthening adhesive layer and the silane layer, and the step and conditions of lamination were based on the lamination conditions recommended from RO-4450 so as to obtain the composite laminates I to III. The detailed compositions and peel strengths thereof are as shown in Table 1.

Comparative Example 1

The present comparative example is similar to examples 1 to 3, and the difference is that only a silane layer was included between the copper foil substrate and the resin RO-4450. The peel strength thereof is as shown in Table 1.

TABLE 1

| Example/comparative example | Silane | Material of strengthening adhesive layer | Peel strength (kg/cm) |
|---|---|---|---|
| Example 1 | Vinyltrimethoxy silane | Otcavinyl-POSS | 0.54 |
| Example 2 | Vinyltrimethoxy silane | TMTVC | 0.52 |
| Example 3 | Vinyltrimethoxy silane | TMAIC | 0.5 |
| Comparative example 1 | Vinyltrimethoxy silane | NO | 0.45 |

It can be known from the peel strengths of Table 1 that, the peel strength of the case in which the silane layer and the strengthening adhesive layer of the disclosure are included between the copper foil substrate and the resin is higher than the peel strength of the comparative example in which only the silane layer is included, i.e., the composite laminate of the disclosure has better adhesion.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A composite laminate, comprising:
a metal foil layer;
a hydrocarbon resin layer;
a silane layer disposed between the metal foil layer and the hydrocarbon resin layer, wherein the silane layer has a silane compound having a double bond functional group, and the silane compound having the double bond functional group has a structure of chemical formula $R_1$—$Si(OR_2)_3$, wherein $R_1$ is $C_2$ to $C_8$ alkenyl and $R_2$ is $C_1$ to $C_8$ alkyl; and
a strengthening adhesive layer disposed between the silane layer and the hydrocarbon resin layer, wherein a material of the strengthening adhesive layer comprises a compound having 3 or more double bond functional groups and a polymerization initiator, wherein the compound having 3 or more double bond functional groups is trimethylallyl isocyanurate or the polyhedral oligomeric silsesquioxane having 3 or more double bond functional groups, which comprises octavinyl-POSS.

2. The composite laminate of claim 1, wherein the silane compound having the double bond functional group has a structure of chemical formula $R_1$—$Si(OR_2)_3$, wherein $R_1$ is vinyl or allyl and $R_2$ is $CH_3$ or $C_2H_5$.

3. The composite laminate of claim 1, wherein the silane compound having the double bond functional group is selected from the group consisting of vinyl trimethoxysilane, vinyl triethoxysilane, vinyl tri(2-methoxyethoxy)silane, vinyl triisopropoxysilane, allyltrimethoxysilane, and allyltriethoxysilane.

4. The composite laminate of claim 1, wherein a 90° peel strength of the strengthening adhesion layer is from 0.5 kg/cm to 0.54 kg/cm.

5. The composite laminate of claim 1, wherein based on 1 part by weight of the compound having 3 or more double bond functional groups, the polymerization initiator is 0.01-0.3 parts by weight.

6. The composite laminate of claim 5, wherein the polymerization initiator is organic peroxide.

7. A double-sided composite laminate, comprising:
a first metal foil layer;
a second metal foil layer;
a hydrocarbon resin layer disposed between the first metal foil layer and the second metal foil layer;
a first silane layer disposed between the first metal foil layer and the hydrocarbon resin layer;
a first strengthening adhesive layer disposed between the first silane layer and the hydrocarbon resin layer;
a second silane layer disposed between the second metal foil layer and the hydrocarbon resin layer; and
a second strengthening adhesive layer disposed between the second silane layer and the hydrocarbon resin layer,
wherein the first silane layer and the second silane layer have a silane compound having a double bond functional group, and the silane compound having the double bond functional group has a structure of chemical formula $R_1$—$Si(OR_2)_3$, wherein $R_1$ is $C_2$ to $C_8$ alkenyl and $R_2$ is $C_1$ to $C_8$ alkyl,
wherein a material of each of the first strengthening adhesive layer and the second strengthening adhesive layer comprises a compound having 3 or more double bond functional groups and a polymerization initiator,
wherein the compound having 3 or more double bond functional groups is trimethylallyl isocyanurate or the polyhedral oligomeric silsesquioxane having 3 or more double bond functional groups, which comprises octavinyl-POSS.

\* \* \* \* \*